United States Patent
Linzer

(10) Patent No.: US 7,965,888 B2
(45) Date of Patent: *Jun. 21, 2011

(54) DIGITAL VIDEO CAMERA NON-INTEGER-RATIO BAYER DOMAIN SCALER

(75) Inventor: Elliot N. Linzer, Suffern, NY (US)

(73) Assignee: Ambarella, Inc., Santa Clara, CA (US)

( * ) Notice: Subject to any disclaimer, the term of this patent is extended or adjusted under 35 U.S.C. 154(b) by 402 days.

This patent is subject to a terminal disclaimer.

(21) Appl. No.: 12/255,020

(22) Filed: Oct. 21, 2008

(65) Prior Publication Data

US 2009/0046170 A1 Feb. 19, 2009

Related U.S. Application Data

(63) Continuation of application No. 11/407,181, filed on Apr. 19, 2006, now Pat. No. 7,646,910.

(51) Int. Cl.
*G06K 9/36* (2006.01)
(52) U.S. Cl. ...................................... 382/166
(58) Field of Classification Search .......... 382/162–163, 382/166–167, 254; 348/222.1–223.1, 246, 348/272–273, 280
See application file for complete search history.

(56) References Cited

U.S. PATENT DOCUMENTS

| | | | |
|---|---|---|---|
| 6,940,061 B2 | 9/2005 | Baharav et al. | 250/226 |
| 7,015,961 B2 | 3/2006 | Kakarala | 348/246 |
| 7,440,016 B2 | 10/2008 | Keshet et al. | 348/280 |
| 7,456,881 B2 | 11/2008 | Hu | 348/273 |
| 7,469,059 B1 | 12/2008 | Lefevere et al. | 382/165 |
| 7,471,842 B2 | 12/2008 | Wu et al. | 382/254 |
| 7,502,505 B2 | 3/2009 | Malvar et al. | 382/162 |
| 7,646,910 B1 * | 1/2010 | Linzer | 382/166 |

* cited by examiner

*Primary Examiner* — Jose L Couso
(74) *Attorney, Agent, or Firm* — Christopher P. Maiorana, PC

(57) ABSTRACT

An apparatus having a buffer and a circuit is disclosed. The buffer may be configured to receive a digital image. The digital image generally has (i) a Bayer color representation and (ii) two initial dimensions in a horizontal direction and a vertical direction respectively. The circuit may be configured to generate a resample image in a signal by down-sampling the digital image in the Bayer color representation such that (i) the resample image has two resample dimensions, (ii) at least one of the resample dimensions is smaller than a respective at least one of the initial dimensions and (iii) the respective at least one initial dimension is a non-integer multiple of the at least one resample dimension.

20 Claims, 7 Drawing Sheets

DIGITAL VIDEO CAMERA NON-INTEGER-RATIO BAYER DOMAIN SCALER

This is a continuation of U.S. Ser. No. 11/407,181, filed Apr. 19, 2006 now U.S. Pat. No. 7,646,910, which is hereby incorporated by reference in its entirety.

FIELD OF THE INVENTION

The present invention relates to a method and/or architecture for digital video cameras generally and, more particularly, to a digital video camera having a non-integer-ratio Bayer domain scaler.

BACKGROUND OF THE INVENTION

Conventional video camera sensors implement a Bayer pattern for converting light into electrical signals. Bayer pixels typically undergo a series of steps, including noise reduction, demosaicing and color space conversion before being compressed into a compressed video signal. If the video camera sensor resolution is greater than the encode resolution for the compression operation, each sensor frame must be scaled before being compressed. Conventional video cameras scale the sensor frames according to one or both of two methods. In a first method, the frame resolution is reduced in the sensor by means of binning (i.e., combining an integer number of like-colored frame samples into a single sample) or skipping (i.e., skipping an integer number of like-colored frame samples for every sample retained). In a second method, the frame resolution is reduced after demosaicing.

The second method commonly provides better image quality than the first method. A Bayer-domain image of a given resolution does not contain full color information at each sample position (i.e., pixel position) because only one color is represented at each sample position. A Bayer-domain image is similar to an image of about half the resolution with all colors know at all pixel locations. For example, if a 4-megapixel (4 MP) Bayer image is reduced by binning 2:1 horizontally and 2:1 vertically, the resulting image is a 1 MP Bayer image. The 1 MP Bayer image contains about as much detail as a ½ MP RGB image.

While the second method will give a better quality than the first method, the second method is not always practical. In particular, the second method can only be used if the sensor is fast enough to output all of the pixels within a video frame period (e.g., 1/60th to 1/24th seconds). Furthermore, a processor performing the demosaicing must be able to process at the pixel rate.

In practice, a small amount of binning and/or skipping is conventionally used in the sensor. The binning/skipping is needed to reduce the Bayer-domain pixel rate to a level low enough that (i) the sensor can output all of the pixels at the video frame rate and (ii) the demosaicing processor can process at the video frame rate. Additional scaling is done after demosaicing to scale to the video frame size.

Referring to FIGS. 1-3, diagrams of various example binning possibilities are illustrated. Each of the FIGS. 1-3 illustrate how pre-binned (initial) pixels are mapped into a Bayer set of post-binned (modified) pixels. Each of the Bayer sets is defined as two green "G" pixels, a red "R" pixel and a blue "B" pixel. To aid in explaining the illustrations, boxes and circles identify each of the red, blue and green initial pixels used to generate a corresponding modified pixel. The two green pixels in each of the Bayer sets are distinguished with a box around one G pixel and a circle around the other G pixel. The boxed green pixels in the pre-binned image are used to generate the boxed green pixel in the post-binned image. The circled green pixels in the pre-binned image are used to generate the circled green pixel in the post-binned image. The boxed blue pixels in the pre-binned image are used to generate the boxed blue pixel in the post-binned image. The boxed red pixels in the pre-binned image are used to generate the boxed red pixel in the post-binned image. The post-binned pixels are commonly used to form a final image.

Referring to FIG. 1, a diagram of a conventional 3× vertical binning of an initial set 10 of pre-binned pixels to a modified set 12 of post-binned pixels is shown. Each group 14a-14n of twelve pre-binned pixels is converted into a single Bayer set 16a-16n of four post-binned pixels as illustrated.

Referring to FIG. 2, a diagram of a conventional 2× horizontal binning of an initial set 20 of pre-binned pixels to a modified set 22 of post-binned pixels is shown. Each group 24a-24n of eight pre-binned pixels is converted into a single Bayer set 26a-26n of four post-binned pixels as illustrated.

Referring to FIG. 3, a diagram of a conventional 2× horizontal and 2× vertical binning of an initial set 30 of pre-binned pixels to a modified set 32 of post-binned pixels is shown. Each group 34a-34n of sixteen pre-binned pixels is converted into a single Bayer set 36a-36n of four post-binned pixels as illustrated.

SUMMARY OF THE INVENTION

The present invention concerns an apparatus having a buffer and a circuit. The buffer may be configured to receive a digital image. The digital image generally has (i) a Bayer color representation and (ii) two initial dimensions in a horizontal direction and a vertical direction respectively. The circuit may be configured to generate a resample image in a signal by down-sampling the digital image in the Bayer color representation such that (i) the resample image has two resample dimensions, (ii) at least one of the resample dimensions is smaller than a respective at least one of the initial dimensions and (iii) the respective at least one initial dimension is a non-integer multiple of the at least one resample dimension.

The objects, features and advantages of the present invention include providing a digital video camera having a non-integer ratio Bayer domain scaler that may (i) perform a non-integer down-sampling within a Bayer color space, (ii) operate without binning and skipping in a sensor, (iii) convert sensor images to a lower resolution image without up-sampling and/or (iv) Bayer-domain down-sample the sensor images to just under a maximum demosaicing rate.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
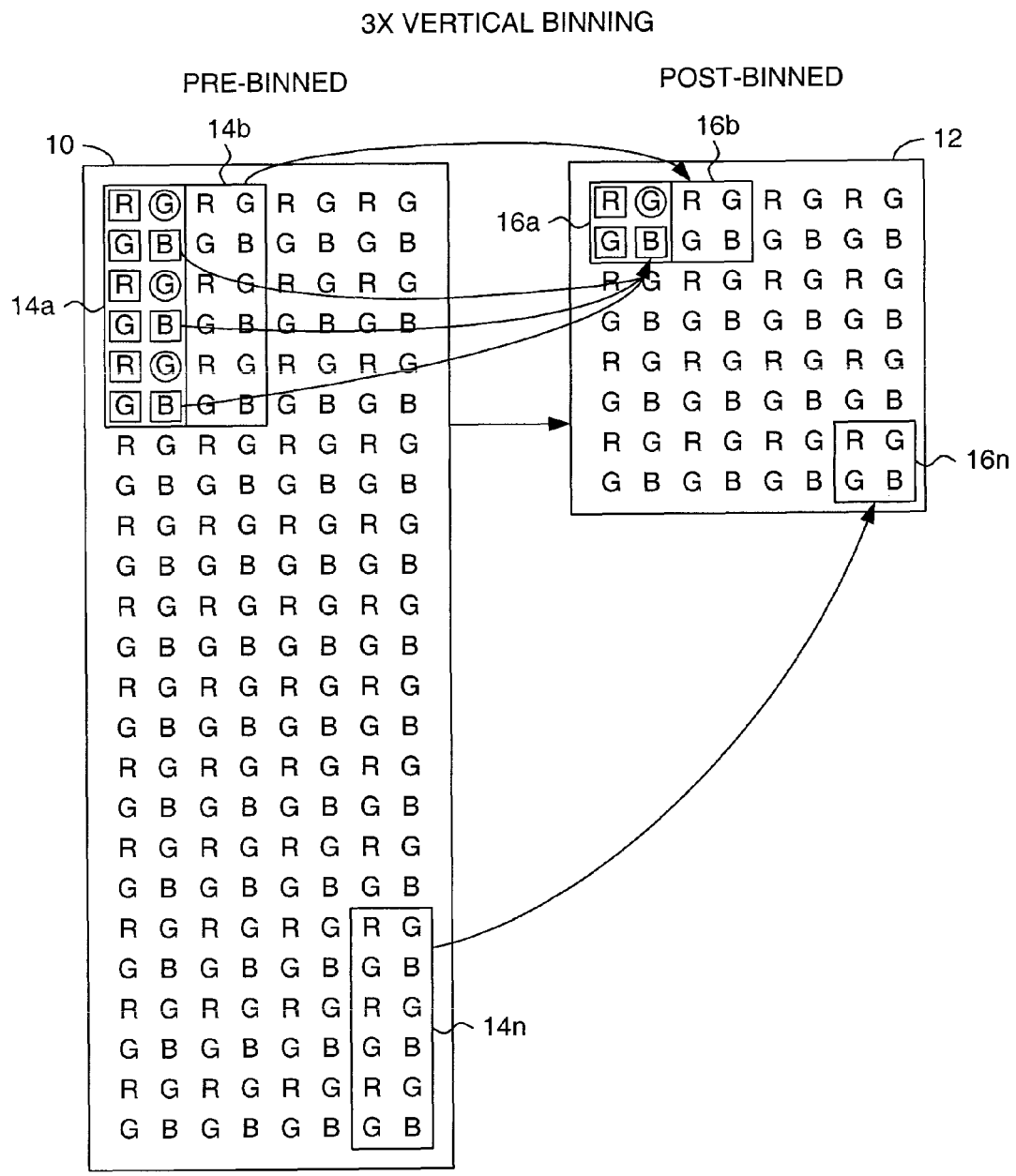
FIG. 1 is a diagram of a conventional 3× vertical binning.
Figure 2:
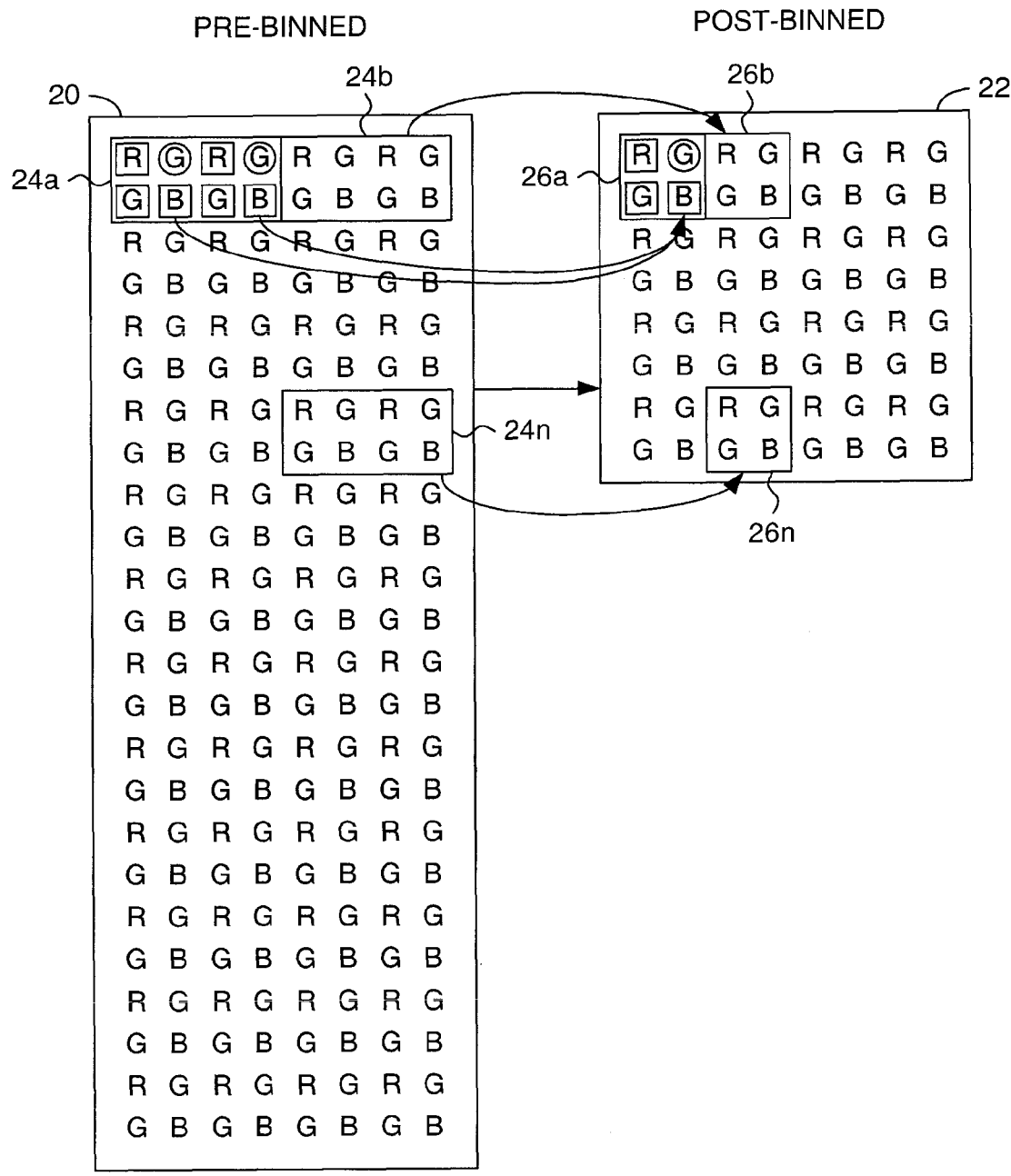
FIG. 2 is a diagram of a conventional 2× horizontal binning.
Figure 3:
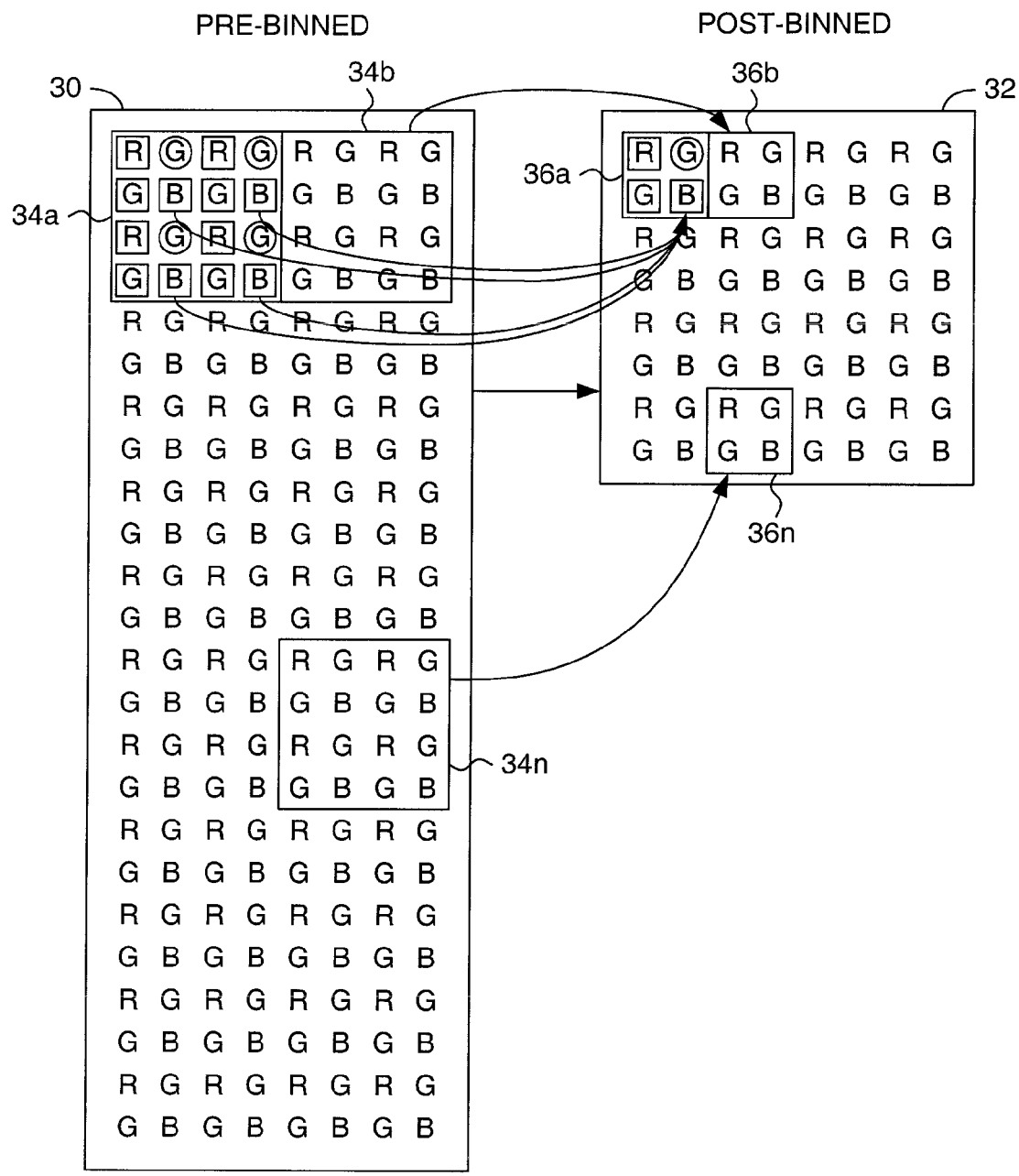
FIG. 3 is a diagram of a conventional 2× horizontal and 2× vertical binning.

Binning and/or skipping generally reduces an integer number of samples from each color in each direction for a sensor to a single sample. The reduction may mean that even when the sensor is very fast and a demosaicing processor may process pictures at a high (but limited) rate, the resolution in the horizontal and/or vertical direction of the Bayer images (or frames) generated by the sensor may be reduced below an optimum resolution for the demosaicing processor.

In an example illustrated in TABLE I, a maximum demosaicing rate (e.g., 2,000,000 samples/image) of a demosaic circuit is generally well above a maximum encoding rate (e.g., 912,600 pixels/image) of an encoder circuit.

TABLE I

| | |
|---|---|
| Bayer resolution, Horizontal | 2,048 |
| Bayer resolution, Vertical | 1,152 |
| Total Bayer samples/image | 2,359,296 |
| Maximum demosaic samples/image | 2,000,000 |
| Encode resolution, Horizontal | 1,280 |
| Encode resolution, Vertical | 720 |
| Total pixels/image | 921,600 |

However, the full Bayer-domain image generated by the sensor may contain more samples than the demosaic circuit can handle in a single image (or frame) period. Therefore, 2:1 vertical and/or 2:1 horizontal binning is conventionally implemented in the sensor to reduce the initial sample rate below the demosaicing rate. Although the demosaicing speed is more than twice the encoding speed, a size of a demosaiced image is commonly smaller than a size of an encoder input image in a particular direction (e.g., horizontal or vertical), as shown in TABLE II below.

TABLE II

| Binning | Hor. (2:1) | Vert. (2:1) |
|---|---|---|
| Bayer resolution, Horizontal | 2,048 | 2,048 |
| Bayer resolution, Vertical | 1,152 | 1,152 |
| Total Bayer samples/image | 2,359,296 | 2,359,296 |
| After binning resolution, Horizontal | 1,024 | 2,048 |
| After binning resolution, Vertical | 1,152 | 576 |
| Total samples/image after binning | 1,179,648 | 1,179,648 |
| Encode resolution, Horizontal | 1,280 | 1,280 |
| Encode resolution, Vertical | 720 | 720 |
| After demosaic scaling factor, Hor. | 1.25 | 0.63 |
| After demosaic scaling factor, Vert. | 0.63 | 1.25 |

In TABLE II, the "scaling factors" generally indicate a change in resolution (e.g., the number of output pixels/image divided by the number of input pixels/image). When horizontal binning and then demosaicing are used (e.g., the center column), the video images are up-scaled horizontally by a scale factor of 1.25 (e.g., from 1024 pixels to 1280 pixels) after demosaicing to achieve the horizontal encode resolution. When vertical binning and then demosaicing are used (e.g., the right column), the video images are up-scaled vertically by a scale factor of 1.25 (e.g., from 576 pixels to 720 pixels) after demosaicing to achieve the vertical encode resolution. In the horizontal case, the binned horizontal detail may be well below a maximum horizontal detail supported by the encode resolution In the vertical case, the vertically binned detail may be well below a maximum vertical detail supported by the encode resolution.

In the present invention, the Bayer images may be scaled horizontally and/or vertically using non-integer resizing ratios, as illustrated in TABLE III below.

TABLE III

| | |
|---|---|
| Bayer scaling factor, Horizontal and Vertical | 0.9207 |
| Bayer resolution, Horizontal | 2,048 |
| Bayer resolution, Vertical | 1,152 |
| Total Bayer samples | 2,359,296 |
| After Bayer scaling resolution, Horizontal | 1,886 |
| After Bayer scaling resolution, Vertical | 1060 |
| Total samples/image after Bayer scaling | 1,998,755 |
| Encode resolution, Horizontal | 1,280 |
| Encode resolution, Vertical | 720 |
| After demosaic scaling factor, Horizontal | 0.68 |
| After demosaic scaling factor, Vertical | 0.68 |

In TABLE III, the initial Bayer image may be scaled by a non-integer scale factor of 0.9207 in each direction (e.g., a 2048×1152 Bayer image may be reduced to a 1886×1060 Bayer image). The resulting 1,998,755 samples/image are generally few enough to be demosaiced with a maximum demosaicing rate of 2,000,000 samples/image. The 1886× 1060 Bayer image may then be demosaiced, followed by post-demosaic scaling (e.g., down-sampling) having another non-integer scale factor (e.g., 0.68) in each direction to produce the 1280×720 sample/image feed into the encoding operation. Compared with conventional methods, which would upscale in at least one direction after demosaicing, the two non-integer down-scaling approach of the present invention may result in a much better picture quality.

In the above example, a post-demosaic down-scaling may be performed (compared with conventional methods that would perform a post-demosaic up-scaling). In some embodiments, the post-demosaic down-scaling may be performed where conventional methods would do a post-demosaic down-scaling by a lesser amount. In other embodiments, a post-demosaic up-scaling may be performed where conventional methods would do a post-demosaic up-scaling by a greater amount.

Figure 4:
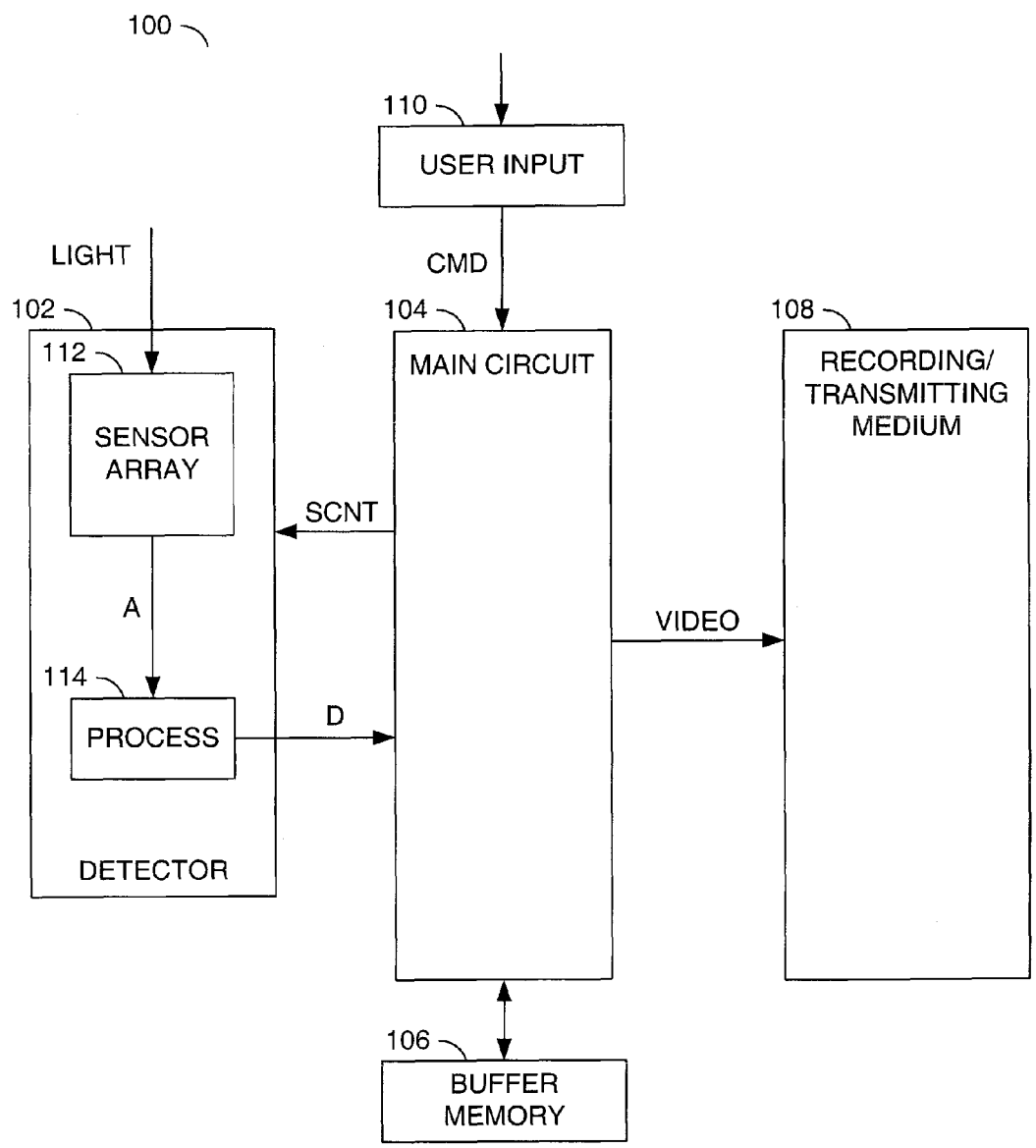
FIG. 4 is a block diagram of a system in accordance with a preferred embodiment of the present invention.

Referring to FIG. 4, a block diagram of a system 100 is shown in accordance with a preferred embodiment of the present invention. The system (or apparatus) 100 may be referred to as a camera. The camera 100 generally comprises a circuit (or module) 102, a circuit (or module) 104, a circuit (or module) 106, a circuit (or module) 108 and a circuit (or module) 110. An optical signal (e.g., LIGHT) may be received by the circuit 102. The circuit 102 may generate and present a digital signal (e.g., D) to the circuit 104. A control signal (e.g., SCNT) may be generated and presented from the circuit 104 to the circuit 102. The circuit 104 may also generate and present a video signal (e.g., VIDEO) to the circuit 108. A command signal (e.g., CMD) may be generated by the circuit 110 and presented to the circuit 104.

The circuit 102 may be referred to as a detector circuit. The detector circuit 102 may be operational to convert the optical image received in the signal LIGHT into the digital signal D in response to the signal SCNT. The digital signal D may convey one or more optical images as one or more electronic images or frames. The control signal SCNT may carry windowing, binning, read rate, offset, scaling, color correction and other information for use by the detector circuit 102. The electronic frames may be generated having an initial resolution (e.g., a horizontal number of image samples by a vertical number of image samples) and an initial color space (e.g., a Bayer color space) at an initial data rate.

The circuit 104 may be referred to as a main circuit. The main circuit 104 may be configured to generate the signal VIDEO by processing the one or more electronic images received in the digital signal D as instructed by a user via the command signal CMD. The main circuit 104 may be operational to generate the control signal SCNT based on the user selections received through the command signal CMD. The signal VIDEO generally comprises a video bitstream (e.g., ITU-R BT.656-4, ITU-R BT.709, SMPTE 240M, H.264/AVC, MPEG-2, MPEG-4) having a sequence of pictures (or frames). The video picture sequence carried by the signal VIDEO may be configured to have a final resolution smaller than the initial resolution of the electronic frames in the digital signal D. The command signal CMD may carry zoom factor commands and optional mode commands from the user. In some embodiments, the detector circuit 102 and the main circuit 104 may be fabricated in (on) separate dies. In other embodiments, the detector circuit 102 and the main circuit 104 may be fabricated in (on) the same die.

The circuit 106 may be referred to as a buffer memory circuit. The buffer memory circuit 106 may be operational to temporarily store image data (e.g., luminance and chrominance) for the main circuit 104. In some embodiments, the buffer memory circuit 106 may be fabricated as one or more dies separate from the main circuit 104 fabrication. In other embodiments, the buffer memory circuit 106 may be fabricated in (on) the same die as the main circuit 104.

The circuit 108 may be referred to as a medium. The medium generally comprises one or more nonvolatile memory devices and/or one or more transmission media capable of storing/transmitting the video stream received in the signal VIDEO. In some embodiments, the medium 108 generally comprises a nonvolatile memory device. For example, a recording medium 108 may be implemented as a FLASH memory or a micro hard disk drive (also known as a "1-inch" hard drive). The memory may be sized (e.g., 4 gigabyte FLASH, 12 gigabyte hard disk drive) to store up to an hour or more of high-definition digital video. In some embodiments, the recording memory circuit 108 may be implemented as a tape medium or an optical medium. A transmitting medium 108 may be implemented as a wired, wireless and/or optical medium. For example, the wired transmission medium 108 may be implemented as an Ethernet network. A wireless transmission medium 108 may be implemented as a wireless Ethernet network and/or a wi-fi network. An optical transmission medium 108 may be implemented as an optical Serial Digital Interface video channel. Other types of media may be implemented to meet the criteria of a particular application.

The circuit 110 may be referred to as a user input circuit. The user input circuit 110 may be operational to generate the signal CMD based on commands received from a user. The commands received may include, but are not limited to, a zoom in command, a zoom out command, a normal mode, a low light mode and a low distortion mode. In some embodiments, the signal CMD may comprise multiple discrete signals (e.g., one signal for each switch implemented in the user input circuit 110). In other embodiments, the signal CMD may carry the user entered commands in a multiplexed fashion as one or a few signals.

The detector circuit 102 generally comprises a sensor array 112 and a circuit (or module) 114. The sensor array 112 may be operational to convert the optical image into a series of values in a signal (e.g., A). The values conveyed in the signal A may be analog voltages representing an intensity value at a predetermined color for each individual sensor element of the sensor array 112. The sensor array 112 may include an electronic cropping (or windowing) capability. The electronic cropping capability may be operational to limit readout of image elements in a window (or an active area) of the sensor array 112. The process circuit 114 may be operational to process and convert the analog signal A to generate the digital signal D.

Processing of the electronic images by the process circuit 114 may include, but is not limited to, analog gain for color corrections, analog offset adjustments for black level calibrations, digital gain for color corrections and digital offsets for color corrections. The conversion generally comprises an analog to digital conversion (e.g., 10-bit). An example implementation of the detector circuit 102 may be an MT9T001 3-megapixel digital image sensor available from Micron Technology, Inc., Bosie, Id. Larger detector circuits 102 may be implemented to meet the criteria of a particular application.

Generally, light may be focused by a lens onto the detector 102. The detector 102 may convert the light into Bayer samples in the signal D. The main circuit 104 may process the Bayer samples and then transfer a compressed video stream (e.g., carried by the signal VIDEO) to the medium 108. The main circuit 104 may be operational to perform a Bayer-domain non-integer resampling operation, a demosaic operation, a conversion operation from an RGB color space to a luminance (luma) and chrominance (chroma) color space (YCbCr), a scaling operation of the luma data and the chroma data, a compression operation and finally transfer the information to the medium 108.

Figure 5:
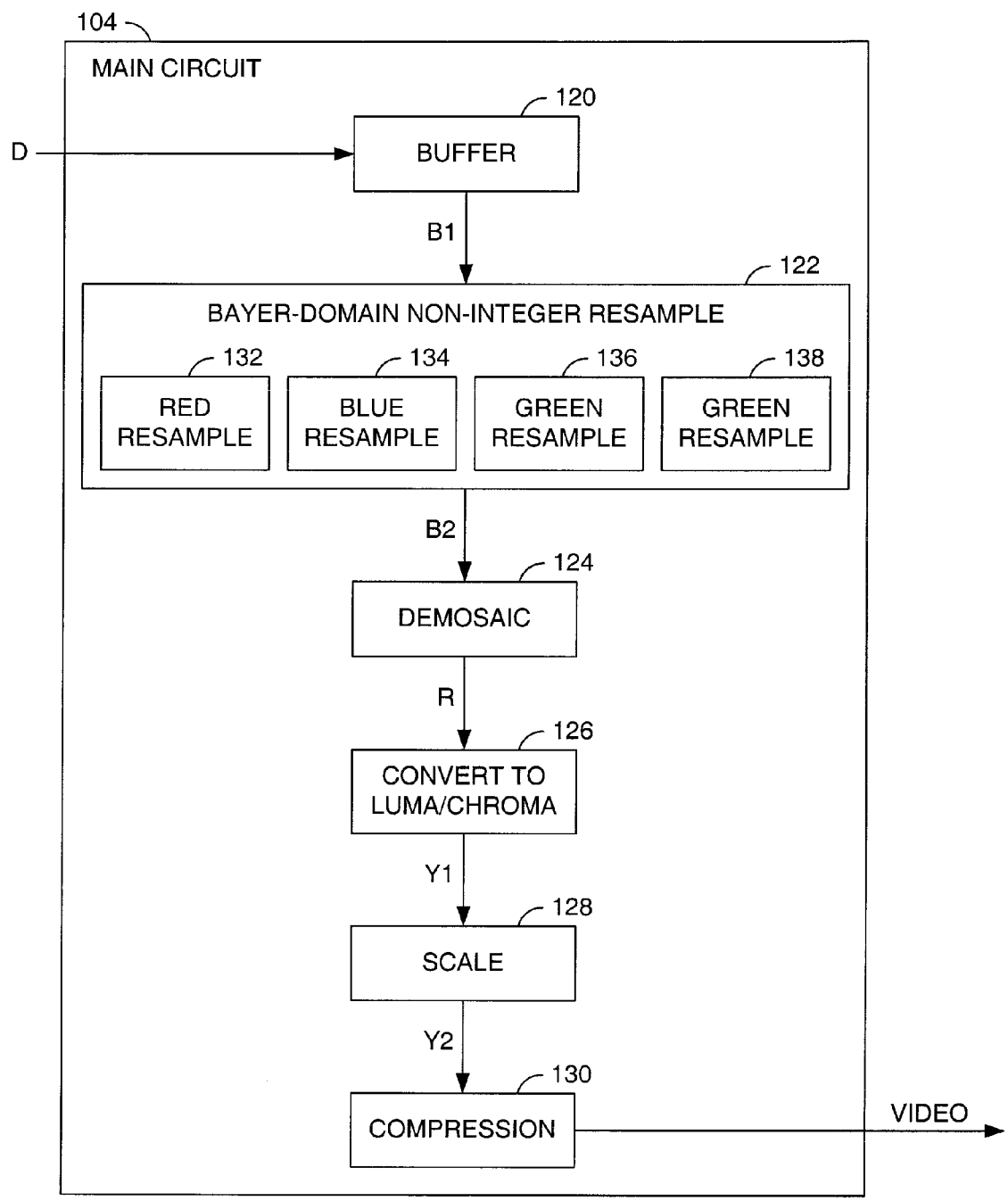
FIG. 5 is a detailed block diagram of an example implementation of the main circuit.

Referring to FIG. 5, a detailed block diagram of an example implementation of the main circuit 104 is shown. The main circuit 104 generally comprises a circuit (or module) 120, a circuit (or module) 122, a circuit (or module) 124, a circuit (or module) 126, a circuit (or module) 128 and a circuit (or module) 130. The circuit 120 may receive the signal D from the detector 102. An intermediate signal (e.g., B1) may transfer Bayer sample data from the circuit 120 to the circuit 122. Another intermediate signal (e.g., B2) generally transfers Bayer sample data from the circuit 122 to the circuit 124. The circuit 124 may present a signal (e.g., R) carrying demosaiced pixel data to the circuit 126. A signal (e.g., Y1) may carry pixel data between the circuit 126 and the circuit 128. The circuit 128 may generate a signal (e.g., Y2) to carry pixel data to the circuit 130. The circuit 130 may generate and present the signal VIDEO to the medium 108.

The circuit 120 may be referred to as a buffer circuit. The buffer circuit 120 may be operational to temporarily store the Bayer images received through the signal D. In some embodiments, the buffer circuit 120 may buffer only a portion of a single Bayer image at a time. In other embodiments, the buffer circuit 120 may sufficiently large to hold an entire Bayer image. The buffered data may be read from the buffer circuit 120 and transferred to the circuit 122 in the signal B1.

The circuit 122 may be referred to as a resample circuit. The resample circuit 122 may be operational to perform a non-integer ratio down-sampling (e.g., resampling) of the Bayer images received through the signal B1. The down-sampling may be performed in one or both directions of the Bayer images (e.g., in a horizontal direction and/or a vertical direction). For example, the resample circuit 122 may scale an input Bayer image of size W0×H0 into an output Bayer image of size W1×H1. The non-integer down-sampling may be arranged such that one or more of the following conditions apply. (i) At least one of the ratio H0/H1 or the ratio W0/W1 is not an integer. (ii) A first output sample in the output Bayer image may be computed using at least a first input sample within the input Bayer image and a second output sample in the output Bayer image may be computed using the first input sample. (iii) At least one output sample may be computed from two or more input samples and the computation is not an average of the input samples. The smaller output Bayer images generated by the resampling may be transferred in the signal B2 to the circuit 124.

The circuit 124 may be referred to as a demosaic circuit. The demosaic circuit 124 may be operational to demosaic the Bayer images received through the signal B2. The demosaic operation may transform the images from the Bayer domain (e.g., one color sample per pixel) to the RGB domain (e.g., three color samples per pixel). The demosaiced images (e.g., RGB images) may then be transferred via the signal R to the circuit 126.

The circuit 126 may be referred to as a conversion circuit. The conversion circuit 126 may be operational to covert the color space of the RGB images received through the signal R into another color space (e.g., YCbCr or YUV). The resulting images (e.g., YCbCr images) may be sent to the circuit 128 in the signal Y1.

The circuit 128 may be referred to as a scale circuit. The scale circuit 128 may be operational to scale-down and/or scale-up the YCbCr images received in the signal Y1 by an integer ratio and/or a non-integer ratio in one or both directions. The scaled images generated by the scale circuit 128 may be presented to the circuit 130 in the signal Y2.

The circuit 130 may be referred to as a compression circuit. The compression circuit 130 may be operational to compress the YCbCr images received from the signal Y2 to generate a video stream in the signal VIDEO. The compression may be compliant with the MPEG-2, MPEG-4 or the H.264 encoding standards. Other video encoding/compression techniques may be implemented to meet the criteria of a particular application.

The Bayer images generated by the sensor array 112 may be thought of as four sub-images, each ¼th the size of the full image. A sub-image generally exists for each of (i) the red samples of the Bayer image, (ii) the blue samples of the Bayer image, (iii) the green samples of the Bayer image on the same line as the red samples and (iv) the green samples of the Bayer image on the same line as the blue samples. For each of the sub-images (e.g., ¼ size images), the resample circuit 122 may perform one or more conventional scaling techniques to down-sample the sub-images. For example, the resample circuit 122 generally comprises a block (or function) 132, a block (or function) 134, a block (or function) 136 and a block (or function) 138. The block 132 may scale the red samples. The block 134 may scale the blue samples. The green samples on the red lines may be scaled by the block 136. The green samples on the blue lines may be scaled by the block 138. The scaling (or down-sampling or resampling) techniques generally implement non-integer scaling techniques. A combination of the scaled sub-images forms the scaled Bayer image.

In some embodiments, each of the above four sub-images may be scaled using separable poly-phase linear filtering. Specifically, each of the four sub-images may be processed by either (i) first scaling the sub-image horizontally using the poly-phase linear filtering and then scaling the sub-image vertically using the poly-phase linear filtering or (ii) first scaling the sub-image vertically using a poly-phase linear filtering and then scaling the sub-image horizontally using the poly-phase linear filtering. Separable poly-phase linear filtering is known in the art and thus specific hardware and/or software designs will not be described in detail.

Figure 6:
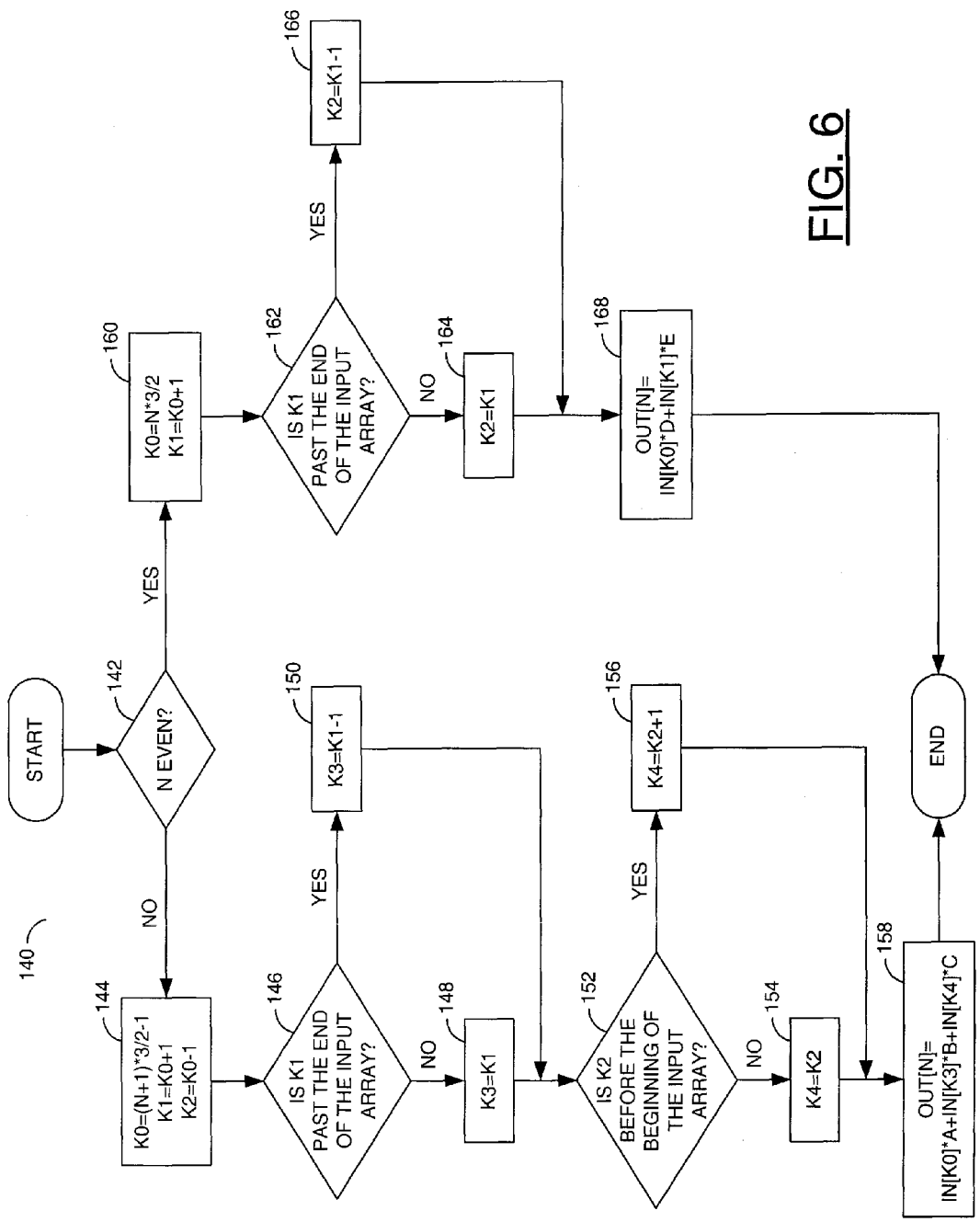
FIG. 6 is a flow diagram of an example poly-phase linear filtering method.

Referring to FIG. 6, a flow diagram of an example poly-phase linear filtering method 140 is shown. The filtering method (or process) 140 generally illustrates a conventional filtering that scales a one-dimensional input sample array (e.g., IN [K], where K is an integer index value) by a non-integer scale factor of ⅔ to generate a one-dimensional output sample array (e.g., OUT [N], where N is an integer index value). As such, the number of output samples in the array OUT is only ⅔rds the number of the input samples in the array IN.

The filtering method 140 generally comprises a step (or block) 142, a step (or block) 144, a step (or block) 146, a step (or block) 148, a step (or block) 150, a step (or block) 152, a step (or block) 154, a step (or block) 156, a step (or block) 158, a step (or block) 160, a step (or block) 162, a step (or block) 164, a step (or block) 166 and a step (or block) 168. Each pass through the filtering method 140 generally begins by examining if the index number N of the output array OUT is an odd value or an even value in the step 142.

If the index number N has an odd value (e.g., the NO branch of block 142), the filtering method 140 may calculate three index values (e.g., K0, K1 and K2) in the step 144 for the input array IN. A check of the index value K1 is made in step 146 to determine if K1 points outside of the input array IN. If K1 is within the input array IN (e.g., the NO branch of step 146), another index value (e.g., K3) may be set to the value of K1 in the step 148. Otherwise (e.g., the YES branch of step 146), then K3 may be set to point to the first input array entry in the step 150.

In the step 152, the index value K2 is checked to determine if K2 points outside of the array IN. If K2 is inside the array IN (e.g., the NO branch of step 152), another index value (e.g., K4) may be set to K2 in the step 154. Otherwise (e.g., the YES branch of step 152), K4 may be set to point to the last entry in the input array IN by the step 156. An output value for the Nth entry (an odd entry) in the output array OUT may be calculated in the step 158 as a weighted sum (e.g., having coefficients "A", "B" and "C") of the input array entries identified by K0, K3 and K4. Other calculations of the output array elements may be implemented to meet the criteria of a particular application.

If N has an even value (e.g., the YES branch of step 142), new input index values K0 and K1 may be calculated in the step 160. A check may be made in step 162 to determine if the index value K0 points outside of the input array IN. If K0 points inside the array IN (e.g., the NO branch of step 162), then K2 may be set the same as K1 in the step 164. If K0 points outside of the input array IN (e.g., the YES branch of step 162), K2 may be set to point to the last entry in the input array IN by the step 166. An output value for the Nth entry (an even entry) in the output array OUT may be calculated in the step 158 as a weighted sum (e.g., having coefficients "D" and "E") of the input array entries identified by K0 and K2. Other calculations of the output array elements may be implemented to meet the criteria of a particular application.

Figure 7:
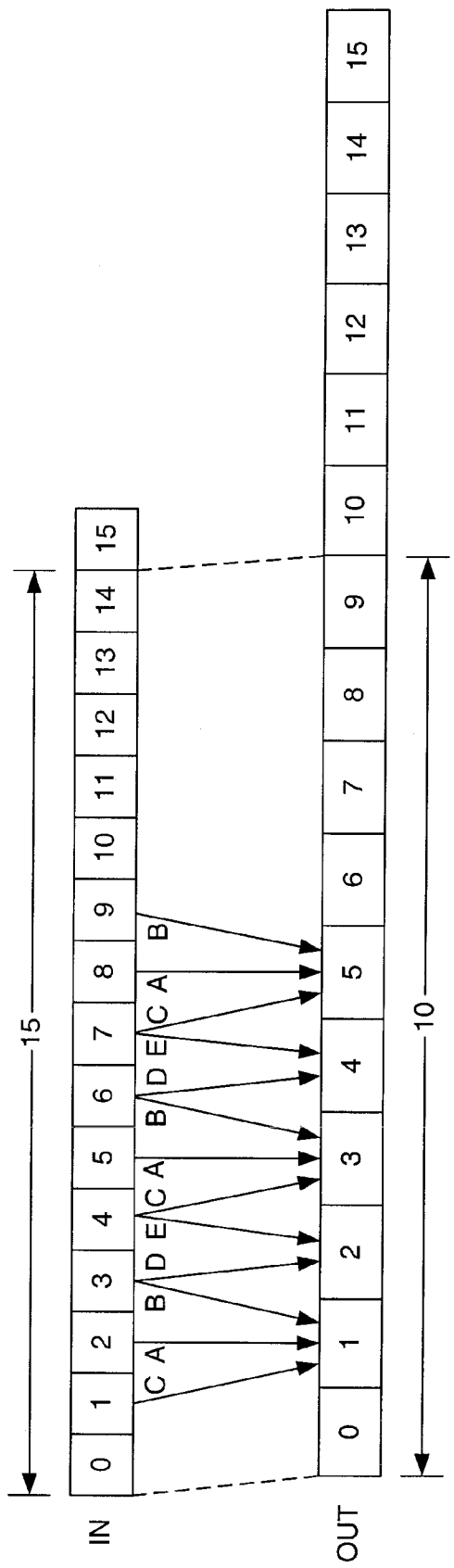
FIG. 7 is a block diagram of an example input array IN and an example output array OUT.

Referring to FIG. 7, a block diagram of an example input array IN and an example output array OUT are shown. FIG. 7 generally illustrates the operation of the filtering method 140 (FIG. 6) with the following coefficients: A=⅝, B=3/16, C=3/16, D=½ and E=½. In the example, three of every four input samples (e.g., IN [1], IN [2] and IN [3]) generate the odd output samples (e.g., OUT [1]). Two of every four input samples (e.g., IN [6] and IN [7]) generate the even output samples (e.g., OUT [4]). As such, a ratio of the number of input samples to the number of output samples may not be an integer ratio (e.g., 2/3). Furthermore, some of the input samples may be used in the computation of two of the output samples. For example, IN [3] may be used to compute both OUT [1] and a portion of OUT [2]. The value of OUT [2] may also be calculated base on IN [4]. Some of the output samples (e.g., the odd samples) may be generated as a weighted sum (e.g., A, B and C do not all have the same value), not a simple average, of the input samples. Some of the output samples (e.g., the even samples) may be generated as an average of the input samples (e.g., D=E=½). None of the above filter attributes are generally shared with binning operations.

The function performed by the block diagram of FIGS. 4 and 5 and the flow diagram of FIG. 6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    a buffer configured to receive a digital image, said digital image having (i) a Bayer color representation and (ii) two initial dimensions in a horizontal direction and a vertical direction respectively; and
    a circuit configured to generate a resample image in a signal by down-sampling said digital image in said Bayer color representation such that (i) said resample image has two resample dimensions, (ii) at least one of said resample dimensions is smaller than a respective at least one of said initial dimensions and (iii) said respective at least one initial dimension is a non-integer multiple of said at least one resample dimension.

2. The apparatus according to claim 1, wherein (i) said digital image further has a first sample rate greater than a maximum sample rate for a demosaicing operation and (ii) said resample image further has a second sample rate no greater than said maximum sample rate for said demosaicing operation.

3. The apparatus according to claim 1, wherein said circuit is further configured to generate a demosaic image by demosaicing said resample image.

4. The apparatus according to claim 3, wherein said circuit is further configured to generate a scaled image by down-scaling said demosaic image.

5. The apparatus according to claim 1, wherein said at least one resample dimension is limited to one of said resample dimensions in said horizontal direction.

6. The apparatus according to claim 1, wherein said at least one resample dimension is limited to one of said resample dimensions in said vertical direction.

7. The apparatus according to claim 1, wherein generation of said resample image in said circuit comprises:
    generating a red sub-image of said resample image by down-sampling a red sub-image of said digital image;
    generating a blue sub-image of said resample image by down-sampling a blue sub-image of said digital image;
    generating a first green sub-image of said resample image by down-sampling a first green sub-image of said digital image; and
    generating a second green sub-image of aid resample image by down-sampling a second green sub-image of said digital image.

8. An apparatus comprising:
    a buffer configured to receive a digital image, said digital image having (i) a Bayer color representation and (ii) two initial dimensions in a horizontal direction and a vertical direction respectively; and
    a circuit configured to generate a resample image in a signal by down-sampling said digital image in said Bayer color representation such that (i) said resample image has two resample dimensions, (ii) at least one of said resample dimensions is smaller than a respective at least one of said initial dimensions and (iii) a first sample in said digital image is used to generate both a second sample in said resample image and a third sample in said resample image.

9. The apparatus according to claim 8, wherein said circuit is further configured to generate a demosaic image by demosaicing said resample image.

10. The apparatus according to claim 9, wherein said circuit is further configured to generate a scaled image by down-scaling said demosaic image.

11. The apparatus according to claim 10, wherein (i) said resample image further has a first sample rate greater than a maximum sample rate for a video encoding operation in said circuit and (ii) said scaled image has a second sample rate no greater than said maximum sample rate for said video encoding operation.

12. The apparatus according to claim 10, wherein said circuit is further configured to generate a video stream by compressing said scaled image.

13. The apparatus according to claim 10, wherein at least one of two demosaic dimensions of said demosaic image is a non-integer multiple of a respective at least one of two scaled dimensions of said scaled image.

14. The apparatus according to claim 8, wherein said respective at least one initial dimension is a non-integer multiple of said at least one resample dimension.

15. An apparatus comprising:
    a buffer configured to receive a digital image, said digital image having (i) a Bayer color representation and (ii) two initial dimensions in a horizontal direction and a vertical direction respectively; and
    a circuit configured to generate a resample image in a signal by down-sampling said digital image in said Bayer color representation such that (i) said resample image has two resample dimensions, (ii) at least one of said resample dimensions is smaller than a respective at least one of said initial dimensions and (iii) a first sample of said resample image is calculated as a non-averaging combination of a plurality of second samples in said digital image.

16. The apparatus according to claim 15, wherein said circuit is further configured to generate a demosaic image by demosaicing said resample image.

17. The apparatus according to claim 15, wherein said circuit is further configured to calculate a third sample of said resample image as an average of a plurality of fourth samples in said digital image.

18. The apparatus according to claim 15, wherein said circuit is further configured to generate both said first sample in said resample image and a third sample in said resample image using one of said second samples in said digital image.

19. The apparatus according to claim 15, further comprising a sensor configured to generate said digital image by sensing an optical image absent both binning and skipping.

20. The apparatus according to claim 15, wherein said respective at least one initial dimension is a non-integer multiple of said at least one resample dimension.

* * * * *